(12) United States Patent
Chen et al.

(10) Patent No.: US 11,293,623 B1
(45) Date of Patent: Apr. 5, 2022

(54) LIGHT PROJECTION STRUCTURE

(71) Applicant: T.Q. OPTOELECTRONICS CO., LTD., Tainan (TW)

(72) Inventors: Hung-Chieh Chen, Tainan (TW); Zhan-Sheng Zhou, Tainan (TW); Ji-Pin Wang, Tainan (TW); Huan-Ping Chiu, Tainan (TW)

(73) Assignee: T.Q. Optoelectronics Co., Ltd., Tainan (TW)

( * ) Notice: Subject to any disclaimer, the term of this patent is extended or adjusted under 35 U.S.C. 154(b) by 0 days.

(21) Appl. No.: 17/344,189

(22) Filed: Jun. 10, 2021

(51) Int. Cl.
| | | |
|---|---|---|
| *F21V 13/04* | (2006.01) | |
| *F21V 5/04* | (2006.01) | |
| *G02B 26/08* | (2006.01) | |
| *F21V 14/04* | (2006.01) | |
| *F21S 41/675* | (2018.01) | |
| *F21S 41/25* | (2018.01) | |

(52) U.S. Cl.
CPC ............... *F21V 5/04* (2013.01); *F21V 13/04* (2013.01); *F21V 14/04* (2013.01); *G02B 26/0833* (2013.01); *F21S 41/25* (2018.01); *F21S 41/675* (2018.01)

(58) Field of Classification Search
None
See application file for complete search history.

(56) References Cited

U.S. PATENT DOCUMENTS

| | | | | |
|---|---|---|---|---|
| 7,311,430 | B2 * | 12/2007 | Tsukamoto | F21S 41/155 362/545 |
| 2014/0321147 | A1 * | 10/2014 | Todaka | F21S 43/14 362/516 |
| 2017/0328534 | A1 * | 11/2017 | Sato | F21S 41/675 |
| 2019/0226654 | A1 * | 7/2019 | Kauschke | F21S 41/141 |

* cited by examiner

*Primary Examiner* — Elmito Breval
(74) *Attorney, Agent, or Firm* — Rosenberg, Klein & Lee

(57) ABSTRACT

The present invention provides a light projection structure, in which an auxiliary lamp device is disposed on one side of a main lamp device. The main lamp device projects a first light pattern and the auxiliary lamp device projects a second light pattern. The second light pattern includes a gap. The first light pattern projected by the main lamp device is projected onto the gap, so that the main lamp device and the auxiliary lamp device combined can broaden the light projection range, and hence producing more uniform light patterns as well as increasing the light illumination area.

10 Claims, 9 Drawing Sheets

LIGHT PROJECTION STRUCTURE

FIELD OF THE INVENTION

The present invention relates generally to a light projection structure, and particularly to a light projection structure applied to a lighting device.

BACKGROUND OF THE INVENTION

As the automotive industry develops, the brightness and light distribution of automotive headlamps are regulated. If the light distribution is nonuniform or too narrow, the driving safety will be challenged.

According to the prior art, most automotive headlamps produce fixed light field and brightness. The light emitted by automotive lamps is mostly concentrated in the front area and leaving the peripheral area with weaker brightness. For drivers, more blind spots will appear in the periphery. Wile driving in the night or dim regions, accidents might occur due to rapid movement of pedestrians or animals. Alternatively, while turning at high speed, owing to insufficient brightness in the front periphery, drivers are usually hard to response promptly owing to sudden appearance of pedestrians, animals, or objects.

Accordingly, to solve the drawbacks of current automotive headlamps, the present invention provides a light projection structure, in which an auxiliary lamp device is disposed on one side of a main lamp device. The main lamp device emits a pixel-array ray and projects a first light pattern; the auxiliary lamp device projects a second light pattern. The second light pattern includes a gap. The first light pattern is projected onto the gap. By using the above structure, the produced light patterns can be more uniform and the light illumination area can be increased.

SUMMARY

An objective of the present invention is to provide a light projection structure, in which an auxiliary lamp device is disposed on one side of a main lamp device. The main lamp device projects a first light pattern and the auxiliary lamp device projects a second light pattern. The second light pattern includes a gap. The first light pattern is projected onto the gap. In addition, the first light pattern is a dynamic pattern.

To achieve the above objective, the present invention discloses a light projection structure, which comprises a main lamp device and an auxiliary lamp device. The main lamp device projects a first light pattern. The auxiliary lamp device is disposed on one side of the main lamp device and includes a second light-emitting module, a second light-redirecting device, and a second lens device. The second light-emitting module emits a second ray. The second light-redirecting device is disposed on one side of the second light-emitting module. The second ray is projected to and reflected by the second light-redirecting device. The second lens device is disposed on a second light-emitting side of the second light-redirecting device. A portion of the second ray is reflected by the second light-redirecting device and passes through the second lens device. The other portion of the second ray is reflected by the second light-redirection device to a second light-pattern converter. The second lens device projects the second light pattern. The second light pattern includes a gap. The first light pattern is projected onto the gap.

According to an embodiment of the present invention, the main lamp device includes a first light-emitting module, a first light-redirecting device, a first light-pattern converter, and a first lens device. The first light-emitting module emits a first ray. The first light-redirecting device is disposed below the first light-emitting module. The first ray is projected to and reflected by the first light-redirecting device. The first light-pattern converter is disposed on one side of the first light-redirecting device and below the first light-emitting module. The first ray is projected to and reflected by the first light-pattern converter to form a pixel-array ray. The first lens device is disposed on a first light-emitting side of the first light-pattern converter. The pixel-array ray passes through the first lens device. Then the first lens device projects the first light pattern.

According to an embodiment of the present invention, the first light-pattern converter is a digital micromirror device (DMD). The first light-pattern converter controls the first light pattern to form a dynamic pattern.

According to an embodiment of the present invention, the light projection structure further comprises a first base. The first light-pattern converter is disposed on one side of the first base. In addition, the first light-redirecting device and the first lens device are disposed at the front end of the first base, respectively.

According to an embodiment of the present invention, the first lens device includes a first hollow housing and one or more first lens. The first hollow housing is disposed at the front end of the first base. The first light-redirecting device is disposed in the first hollow housing. The one or more first lens is disposed at the front end of the first hollow housing.

According to an embodiment of the present invention, an inclination angle of a fixing part with respect to a first light shelter and a second light shelter is between 10 and 30 degrees.

According to an embodiment of the present invention, the light projection structure further comprises a second base. The second light-emitting module and the second light-redirecting device are disposed on the second base, respectively. The second light-redirecting device covers the second light-emitting module. The second light-pattern converter and the second lens device are disposed at the front end of the second base, respectively.

According to an embodiment of the present invention, the second lens device includes a second hollow housing and a second lens. The second hollow housing is disposed at the front end of the second base. The second light-pattern converter is disposed in the second hollow housing. The second lens is disposed at the front end of the second hollow housing. The second lens device further includes a first recess and a second recess in the second hollow housing. The first recess corresponds to the first light shelter; the second recess corresponds to the second light shelter. One side of the first light shelter is disposed in the first recess; and one side of the second light shelter is disposed in the second recess.

According to an embodiment of the present invention, the two arcs on the second light pattern correspond to a first curved edge of the first light shelter and a second curved edge of the second light shelter, respectively.

According to an embodiment of the present invention, the gap is disposed between the two arcs.

DETAILED DESCRIPTION

In order to make the structure and characteristics as well as the effectiveness of the present invention to be further understood and recognized, the detailed description of the present invention is provided as follows along with embodiments and accompanying figures.

The present invention is to solve the problems in the projection devices according to the prior art. The most automotive headlamps according to the prior art produce fixed light field and brightness. The light emitted by automotive lamps is mostly concentrated in the front area and leaving the peripheral area with weaker brightness. Accordingly, the present invention provides a light projection structure, in which an auxiliary lamp device is disposed on one side of a main lamp device. The main lamp device projects a first light pattern and the auxiliary lamp device projects a second light pattern. The second light pattern includes a gap. The first light pattern is projected onto the gap. In addition, the first light pattern is a dynamic pattern.

Figure 1:
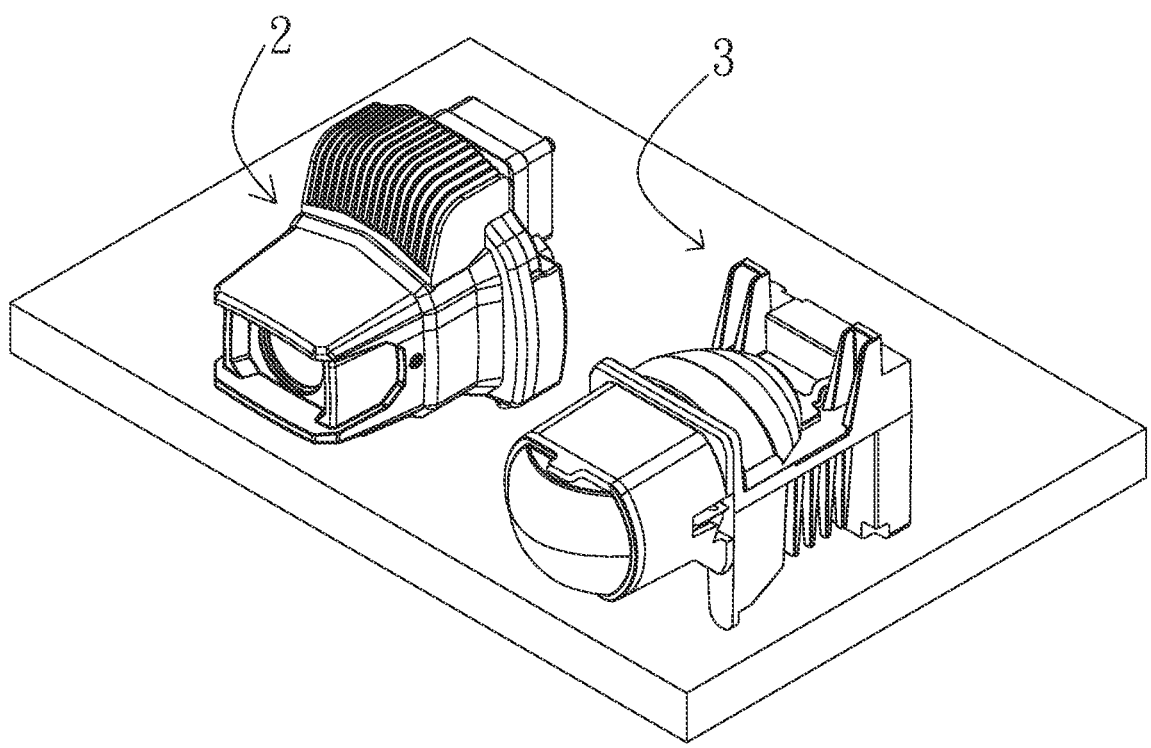
FIG. 1 shows a stereoscopic view according to a preferred embodiment of the present invention.

First, please refer to FIG. 1, which shows a stereoscopic view according to a preferred embodiment of the present invention. As shown in the figure, the present invention provides a light projection structure 1, which comprises a main lamp device 2 and an auxiliary lamp device 3. The auxiliary lamp device 3 is disposed on one side of the main lamp device 2.

Figure 2A:
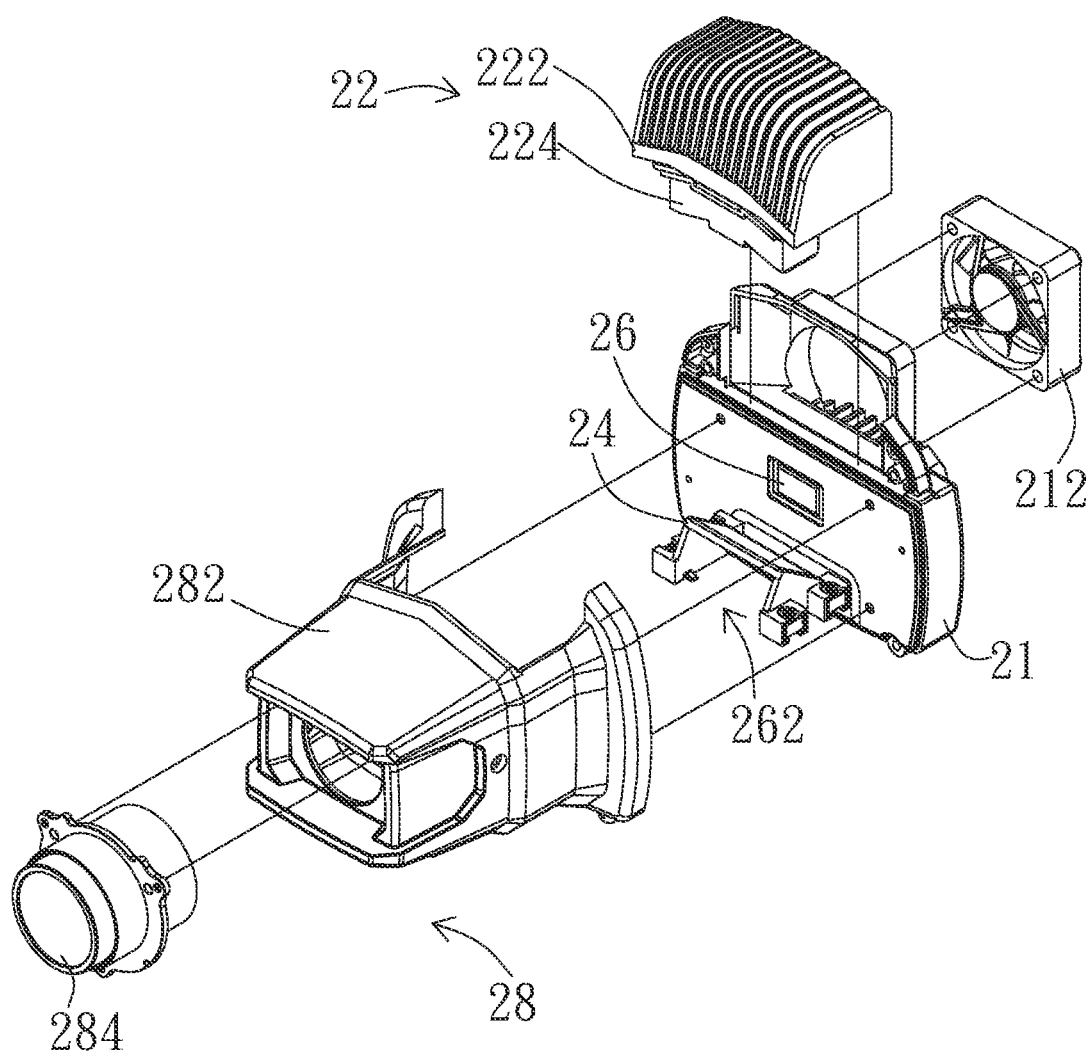
FIG. 2A shows an exploded view of the main lamp device according to a preferred embodiment of the present invention.
Figure 2B:
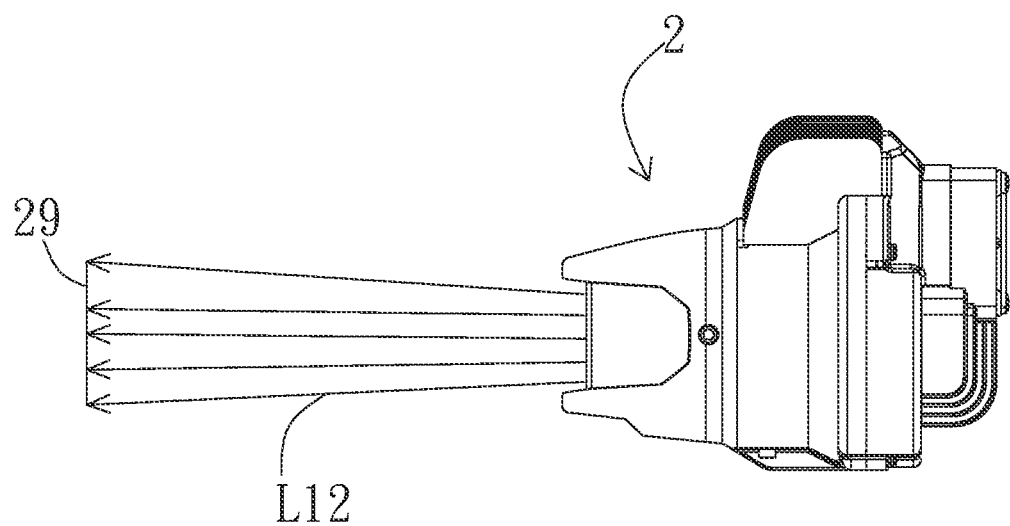
FIG. 2B shows a cross-sectional view of the main lamp device according to a preferred embodiment of the present invention.

Please refer to FIG. 2A, which shows an exploded view of the main lamp device according to a preferred embodiment of the present invention, and to FIG. 2B, which shows a cross-sectional view of the main lamp device according to a preferred embodiment of the present invention. As shown in the figures, the main lamp device 2 includes a first light-emitting module 22, a first light-redirecting device 24, a first light-pattern converter 26, and a first lens device 28.

The first light-redirecting device 24 is disposed below the first light-emitting module 22. To elaborate, the first light-redirecting device 24 is disposed on the light-emitting path of the first light-emitting module 22. The first light-pattern converter 26 is disposed on one side of the first light-redirecting device 24 and below the first light-emitting module 22. Furthermore, the first lens device 28 is disposed on a first light-emitting side 262 of the first light-pattern converter 26. The first light-emitting module 22 emits light downwards. The first light-redirecting device 24 is disposed obliquely corresponding to the first light-emitting module 22.

Figure 2C:
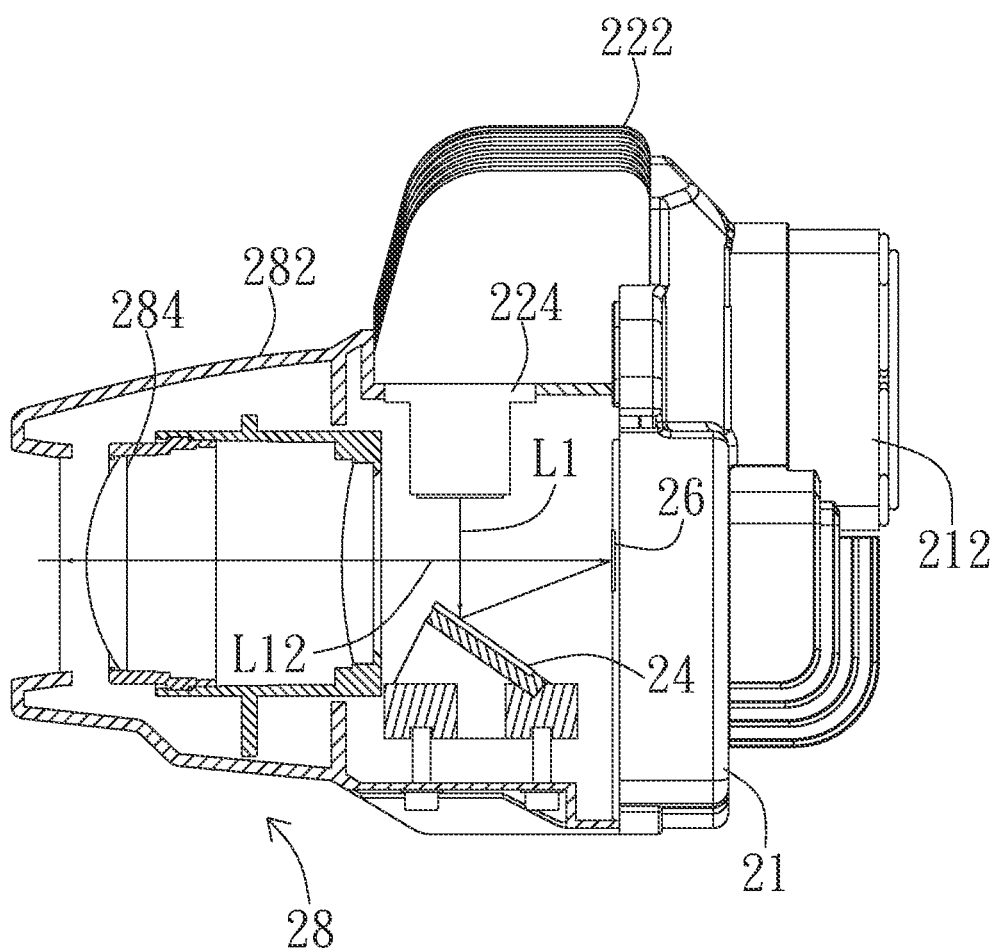
FIG. 2C shows a side view of the main lamp device according to a preferred embodiment of the present invention.

Please continue to refer to FIG. 2B as well as to FIG. 2C, which shows a side view of the main lamp device according to a preferred embodiment of the present invention. As shown in the figures, when the first light-emitting module 22 emits a first ray L1, the first ray L1 will be projected to and reflected by the first light-redirecting device 24. It is then projected to the first light-pattern converter 26 and reflected to form a pixel-array ray L12. The pixel-array ray L12 is projected to and reflected by the first lens device 28 to form a first light pattern 29.

The main lamp device 2 emits the first ray L1, converts the first ray L1 to the pixel-array ray L12, and projects the pixel-array ray L12 to give the first light pattern 29. The first light pattern 29 is a dynamic pattern. The first light-pattern converter 26 inside the main lamp device 2 is a DMD, which is a matrix formed by micromirrors (fine and miniature reflective mirrors) arranged a semiconductor chip. Each micromirror controls a pixel in the projected picture and hence controlling the shape of the first light pattern 29 to form a dynamic pattern.

Please continue to refer to FIGS. 2A to 2C for further illustrating the device connection in the main lamp device 2. The main lamp device 2 further includes a first base 21. The first light-pattern converter 26 is disposed on the first base 21. The first light-emitting module 22 further includes a first substrate 222 and one or more first light-emitting unit 224. The first substrate 222 is disposed on the first base 21. The one or more light-emitting unit 224 is disposed below the first substrate 222 and emits light downwards. The one or more light-emitting unit 224 is a light-emitting diode (LED). Besides, the first light-redirecting device 24 and the first lens device 28 are disposed at the front end of the first base 21, respectively. To further elaborate, the first lens device 28 includes a first hollow housing 282 and one or more first lens 284. The first hollow housing 282 is disposed at the front end of the first base 21. In other words, one end of the first hollow housing 282 is disposed at the front end of the first base 21. The first light-redirecting device 24 is disposed inside the first hollow housing 282. The one or more first lens 284 is disposed inside the front end of the first hollow housing 282. Furthermore, the one or more first lens 284 is disposed at the other end opposing to the front end of the first base 21 at which one end of the first hollow housing 282 is disposed. A fan 212 is further disposed on one side of the first base 21 for reinforcing heat dissipation of the first base 21.

Figure 3A:
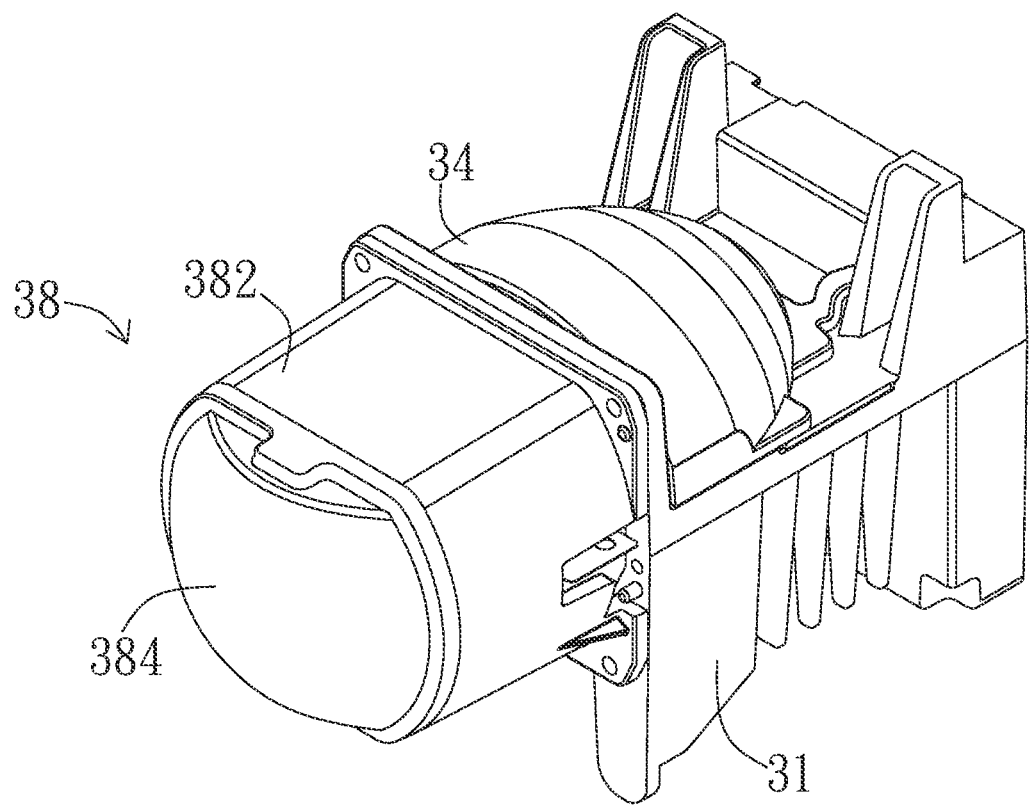
FIG. 3A shows a stereoscopic view of the auxiliary lamp device according to a preferred embodiment of the present invention.
Figure 3B:
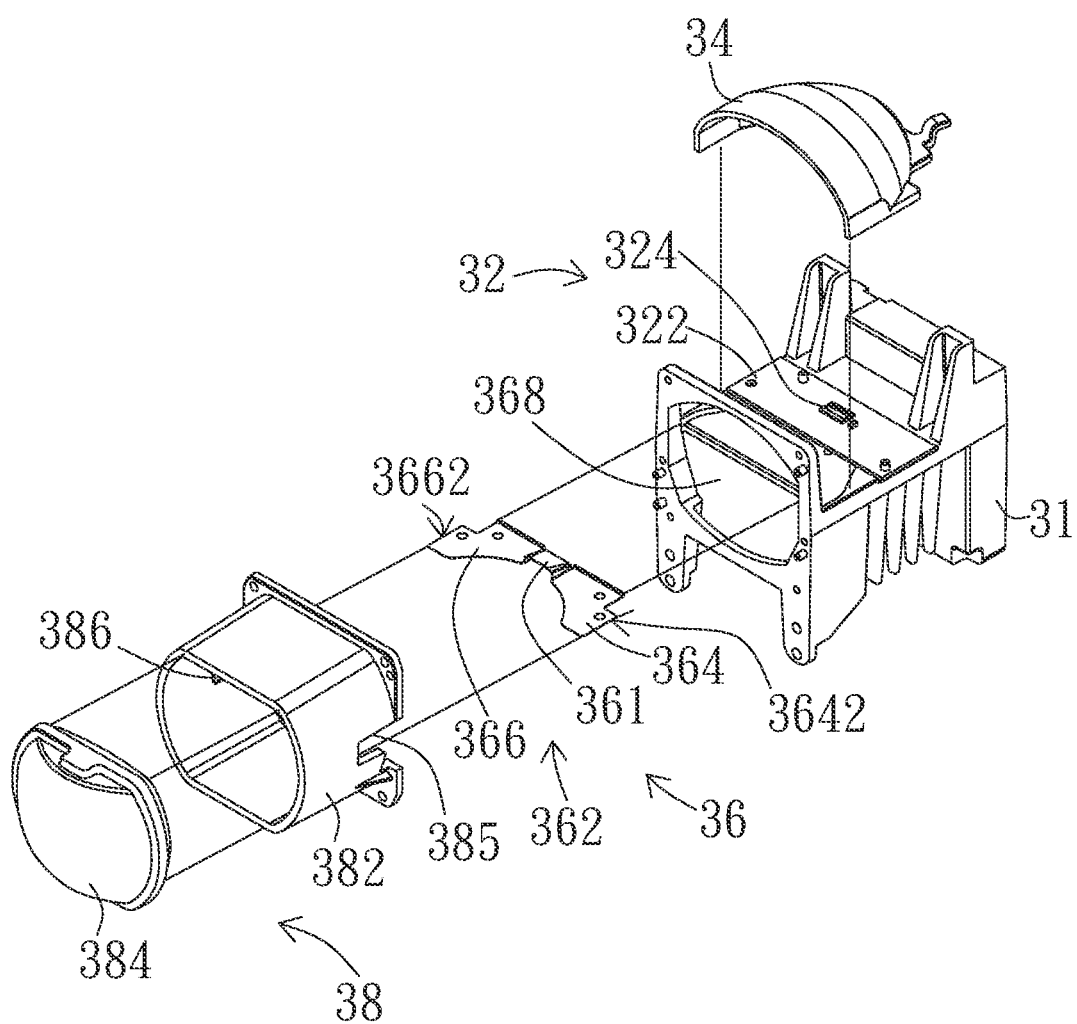
FIG. 3B shows an exploded view of the auxiliary lamp device according to a preferred embodiment of the present invention.

Please continue to refer to FIG. 3A, which shows a stereoscopic view of the auxiliary lamp device according to a preferred embodiment of the present invention, and to FIG. 3B, which shows an exploded view of the auxiliary lamp device according to a preferred embodiment of the present invention. As shown in the figures, the auxiliary lamp device 3 includes a second light-emitting module 32, a second light-redirecting device 34, a second light-pattern converter 36, and a second lens device 38.

The second light-redirecting device 34 is disposed on one side of the second light-emitting module 32. To elaborate, the second light-redirecting device 34 shelters the light-emitting path of the second light-emitting module 32. The second light-pattern converter 36 includes a DMD 361 and a fixing part 362. The DMD 361 is disposed on the fixing part 362 and is the same as the DMD described above. The fixing part 362 is disposed at the front end below the second light-redirecting device 34. Both ends of the fixing part 362 extend downwards to include a first light shelter 364 and a second light shelter 366, respectively. Furthermore, both ends of the fixing part 362 extend downwards and sideways to include the first light shelter 364 and the second light shelter 366, respectively. The second lens device 38 is disposed on a second light-emitting side 368 of the second light-redirecting device 34.

Figure 3C:
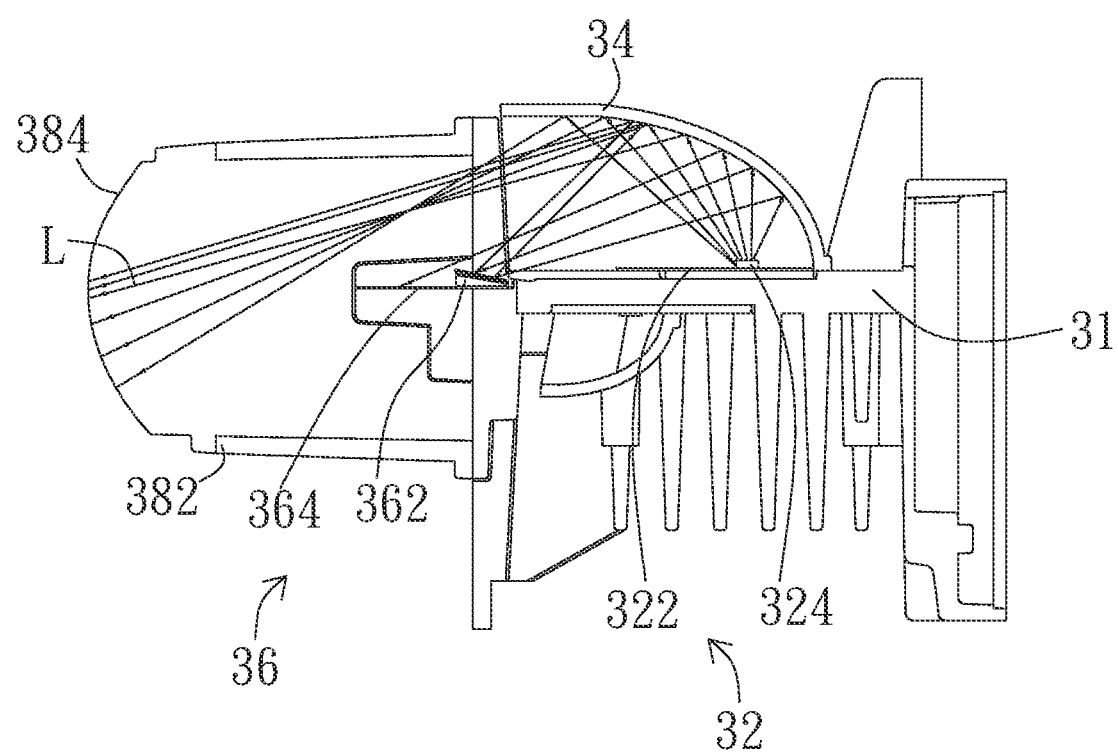
FIG. 3C shows a cross-sectional view of the auxiliary lamp device according to a preferred embodiment of the present invention.

Please continue to refer to FIG. 3C, which shows a cross-sectional view of the auxiliary lamp device according to a preferred embodiment of the present invention. As shown in the figure, when the second light-emitting module 32 emits a second ray L2, the second ray L2 will be projected to and reflected by the second light-redirecting device 34. A portion of the second ray L2 will be reflected by the second light-redirecting device 34 and passes through the second lens device 38. The other portion of the second ray L2 will be reflected by the second light-redirecting device 34 to the second light-pattern converter 36. Part of the second ray L2 will be projected by the second lens device 38.

Figure 3D:
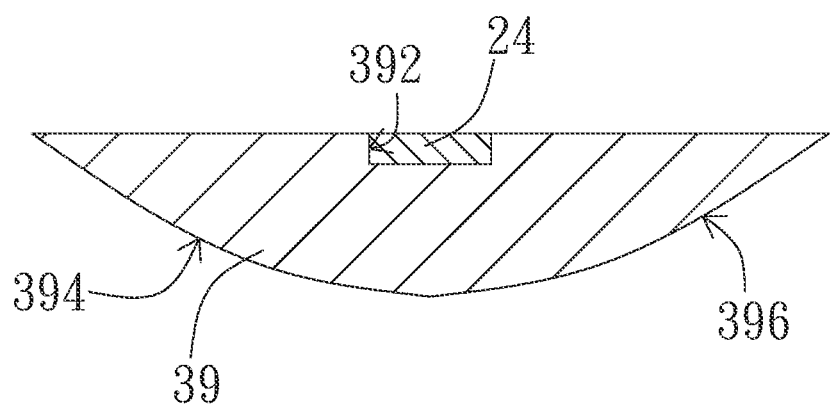
FIG. 3D shows a schematic diagram of the light pattern of the main lamp device combined with the auxiliary lamp device according to a preferred embodiment of the present invention.

Please continue to refer to FIGS. 3A to 3C as well as to FIG. 3D, which shows a schematic diagram of the light pattern of the main lamp device combined with the auxiliary lamp device according to a preferred embodiment of the present invention. As shown in the figures, part of the second ray L2 will be projected by the second lens device 38 to form a second light pattern 39. The second light pattern 39 includes a gap 392 corresponding to the fixing part 362. Namely, the shape or the area of the gap 392 varies according to the shape or the area of the fixing part 362. The first light pattern 29 is projected onto the gap 392.

Please continue to refer to FIGS. 3A to 3C for further illustrating the device connection in the auxiliary lamp device 3. The auxiliary lamp device 3 further includes a second base 31. The second light-emitting module 32 and the second light-redirecting device 34 are disposed on the second base 31, respectively. The second light-redirecting device 34 covers and shelters the second light-emitting module 32. The second light-emitting module 32 further includes a second substrate 322 and one or more first light-emitting unit 324. The second substrate 322 is disposed on the second base 31. The one or more light-emitting unit 324 is disposed on the second substrate 322. The second light-redirecting device 34 is disposed on the second base 31 and covers the one or more second light-emitting unit 324. The one or more light-emitting unit 324 is an LED. Besides, the second light-pattern converter 36 and the second lens device 38 are disposed at the front end of the second base 31, respectively. To further elaborate, the second lens device 38 includes a second hollow housing 382 and a second lens 384. The second hollow housing 382 is disposed at the front end of the second base 31. In other words, one end of the second hollow housing 382 is disposed at the front end of the second base 31. The second light-pattern converter 36 is disposed inside the second hollow housing 382. The second lens 384 is disposed inside the front end of the second hollow housing 382. Furthermore, the second lens 384 is disposed at the other end opposing to the front end of the second base 31 at which one end of the second hollow housing 382 is disposed.

In addition, the second hollow housing 382 further includes a first recess 385 and a second recess 386 disposed on both sides of the second hollow housing 382. The first recess 385 and the second recess 386 correspond to a first extension part 3642 on one side of the first light shelter 364 and a second extension part 3663 on one side of the second light shelter 366, respectively. When the second hollow housing 382 is disposed at the front end of the second base 31, the first extension part 3642 and the second extension part 3662 are disposed in the first recess 385 and the second recess 386, respectively, for preventing light leakage. Furthermore, to fix the first light shelter 364 and the second light shelter 366 effectively, one side of the first extension part 3642 can be disposed on one side of the first recess 385, while one side of the second extension part 3662 can be disposed on one side of the second recess 386. As the auxiliary lamp device 3 is shaken violently, the arrangement can avoid the second light-pattern converter 36 from falling off.

Figure 4:
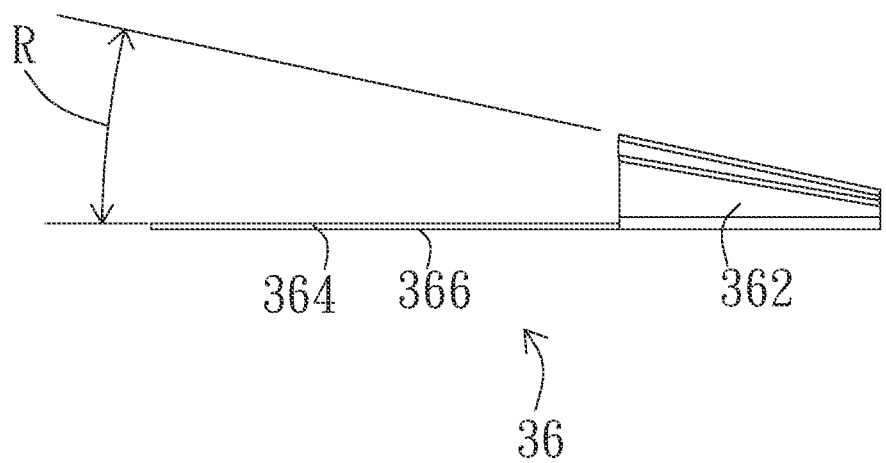
FIG. 4 shows a side view of the second light-pattern converter according to a preferred embodiment of the present invention.

Please continue to refer to FIG. 4, which shows a side view of the second light-pattern converter according to a preferred embodiment of the present invention. As shown in the figure, the fixing part 362 is higher than the first light shelter 364 and the second light shelter 366. Moreover, the height of the first light shelter 364 and the second light shelter 366 are parallel. The top surface of the fixing part 362 is inclined at the first light shelter 364 and the second light shelter 366. An inclination angle R of the fixing part 362 with respect to the first light shelter 364 and the second light shelter 366 is between 10 to 30 degrees. The inclination angle R is used for saving the area of the fixing part 362 as well as producing the gap 392 in the second light pattern 39.

Please continue to refer to FIGS. 3D and 4. As shown in the figures, the two arc in the second light pattern 39 are a first curved edge 394 and a second curved edge 396. A portion of the second ray L2 is reflection by the second light-redirecting device 34 and passes through the second lens device 38. The other portion of the second ray L2 is reflected by the second light-redirecting device 34 to the second light-pattern converter 36. The part of the second ray L2 not reflected to the second light-redirecting device 34 will form the second light pattern 39. The first curved edge 394 and the second curved edge 396 in the second light pattern 39 correspond to the shapes of the first light shelter 364 and the second light shelter 366, respectively.

To sum up, according to the light projection structure of the present invention, the auxiliary lamp device is disposed on one side of the main lamp device. The first light-emitting module in the main lamp device emits the first ray to the first light-redirecting device for reflection. The first ray is reflected to the first light-pattern converter to form the pixel-array ray. The pixel-array ray will be projected via the first lens device to form the first light pattern. The second light-emitting module in the auxiliary lamp device emits the second ray to the second light-redirecting device for reflection. A portion of the reflected second ray will be projected via the second lens device to form the second light pattern. The other portion of the second ray will be projected to the second light-pattern converter. The second light pattern includes the gap. The first light pattern by the main lamp device is projected onto the gap, so that the main lamp device and the auxiliary lamp device combined can broaden the light projection range, and hence producing more uniform light patterns as well as increasing the light illumination area.

The foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A light projection structure, comprising:
a main lamp device, projecting a first light pattern; and
an auxiliary lamp device, disposed on one side of said main lamp device, and including:
   a second light-emitting module, emitting a second ray;
   a second light-redirecting device, disposed on one side of said second light-emitting module, and said second ray projected to and reflected by said second light-redirecting device; and
   a second lens device, disposed on a second light-emitting side of said second light-redirecting device, a portion of said second ray reflected by said second light-redirecting device and passing through said second lens device, the other portion of said second ray reflected by said second light-redirecting device to a second light-pattern converter, and said second lens device projecting said second light pattern, said second light-pattern converter includes a fixing part;
where said second light pattern includes a gap and said first light pattern is projected onto said gap.

2. The light projection structure of claim 1, wherein said main lamp device includes:
a first light-emitting module, emitting a first ray;
a first light-redirecting device, disposed below said first light-emitting module, and said first ray projected to and reflected by said first light-redirecting device;
a first light-pattern converter, disposed on one side of said first light-redirecting device and below said first light-emitting module, and said first ray projected to said first light-pattern converter and reflected to form a pixel-array ray; and
a first lens device, disposed on a first light-emitting side of said first light-pattern converter, said pixel-array ray passing through said first lens device, and said first lens device projecting said first light pattern.

3. The light projection structure of claim 2, wherein said first light-pattern converter is a digital micromirror device (DMD); and said first light-pattern converter controls said first light pattern to form a dynamic pattern.

4. The light projection structure of claim 2, and further comprising a first base, said first light-pattern converter disposed on one side of said first base, and said first light-redirecting device and said first lens device disposed at the front end of said first base, respectively.

5. The light projection structure of claim 2, wherein said first lens device includes a first hollow housing and one or more first lens; said first hollow housing is disposed at the front end of said first base; said first light-redirecting device is disposed in said first hollow housing; and said one or more first lens is disposed at the front end of said first hollow housing.

6. The light projection structure of claim 1, and further comprising a second base, said second light-emitting module and said second light-redirecting device disposed on said second base, respectively, said second light-redirecting device covering said second light-emitting module, and said second light-pattern converter and said second lens device disposed at the front end of said second base, respectively.

7. The light projection structure of claim 1, wherein said second lens device includes a second hollow housing and a second lens; said second hollow housing is disposed at the front end of said second base; said second light-pattern converter is disposed in said second hollow housing; said second lens is disposed at the front end of said second hollow housing; said second lens device further includes a first recess and a second recess in said second hollow housing; said first recess corresponds to a first light shelter; said second recess corresponds to a second light shelter; one side of said first light shelter is disposed in said first recess; and one side of said second light shelter is disposed in said second recess.

8. The light projection structure of claim 7, wherein an inclination angle of a fixing part with respect to said first light shelter and said second light shelter is between 10 and 30 degrees.

9. The light projection structure of claim 7, wherein the two arcs on said second light pattern correspond to a first curved edge of said first light shelter and a second curved edge of said second light shelter, respectively.

10. The light projection structure of claim 9, wherein said gap is disposed between said two arcs.

* * * * *